United States Patent [19]
de Mendez

[11] 4,214,812
[45] Jul. 29, 1980

[54] CONNECTING MODULE FOR SINGLE-STRAND OPTICAL CONDUCTORS AND A CONNECTOR INCLUDING AT LEAST ONE SUCH MODULE

[75] Inventor: Michel O. de Mendez, Montlery, France

[73] Assignee: Souriau & Cie, Boulogne-Billancourt, France

[21] Appl. No.: 1,476

[22] Filed: Jan. 8, 1979

[30] Foreign Application Priority Data

Jan. 19, 1978 [FR] France ................... 78 01445

[51] Int. Cl.$^2$ ............................................. G02B 5/14
[52] U.S. Cl. ............................................. 350/96.21
[58] Field of Search .............. 350/96.15, 96.20, 96.21, 350/96.22

[56] References Cited

U.S. PATENT DOCUMENTS

| | | | |
|---|---|---|---|
| 4,046,454 | 9/1977 | Pugh | 350/96.21 |
| 4,088,386 | 5/1978 | Hawk | 350/96.21 |
| 4,111,522 | 9/1978 | Auracher et al. | 350/96.21 |
| 4,142,776 | 3/1979 | Cherin et al. | 350/96.21 |
| 4,146,301 | 3/1979 | Cherin et al. | 350/96.21 |
| 4,160,580 | 7/1979 | Le Noane et al. | 350/96.21 |

FOREIGN PATENT DOCUMENTS 2731863  2/1978 Fed. Rep. of Germany ........ 350/96.21
2807860  8/1978 Fed. Rep. of Germany ........ 350/96.21

OTHER PUBLICATIONS

Miller, "A Fiber-Optic-Cable Connector", Bell Syst. Tech. Journal, vol. 54, No. 9, Nov. 1975, pp. 1547-1555.

*Primary Examiner*—John K. Corbin
*Assistant Examiner*—John D. Lee
*Attorney, Agent, or Firm*—J. Harold Nissen

[57] ABSTRACT

A connecting module for single-strand optical conductors and a connector provided with such modules. Each connector comprises two carriers each of which has in an identical fashion a planar face in which one or more small longitudinal V-shaped grooves are provided to receive the single-strand optical conductors. The ends of the optical conductors are disposed in the plane of the facing ends of the two carriers. The module further comprises two cylindrical alignment members, each of which is received in a large V-shaped groove provided in an identical manner in the planar face of each carrier. One of the alignment members is also received in a V-shaped groove provided in the planar face of a stirrup member, and the other alignment member is simply applied against the face of the stirrup member. Elastic means is provided which biases each carrier towards the stirrup member.

10 Claims, 2 Drawing Figures

CONNECTING MODULE FOR SINGLE-STRAND OPTICAL CONDUCTORS AND A CONNECTOR INCLUDING AT LEAST ONE SUCH MODULE

BACKGROUND OF THE INVENTION

This invention relates to a connecting module for single-strand optical conductors, and a connector formed from such a module or a plurality of such modules.

In order to provide for the connection of single-strand optical conductors, it has been proposed to hold the conductors which are to be connected in small grooves. These grooves are of a V-shaped cross-section and are provided in an identical manner in corresponding planar faces of two carriers. The ends of the conductors are disposed in the plane of the facing ends of the carriers so that the conductors can be connected together in face-to-face relationship.

In order to provide for a suitable alignment of the conductors with one another, each of the carriers must have two reference surfaces other than the planar face in which the grooves are provided. The carriers are generally parallelepipedally-shaped, and the aforementioned grooves have to be made by very precise and therefore, highly expensive machining of one side of the base of each of the carriers so that they can be aligned accurately with each other. This is necessary to ensure that the optical conductors are centered and that proper connection is made.

SUMMARY OF THE INVENTION

According to the invention, a connecting module for a single-strand optical conductor is provided which comprises two carriers that are placed in end to end abutment. Each carrier has in an identical manner, a planar face provided with a small longitudinal groove of V-shaped cross-section therein. Each of the carriers is capable of receiving in its small longitudinal groove a respective one of the single-strand optical conductors which are to be connected, and the end of the conductor is disposed in the plane of the facing end of the respective one of the two carriers. One or more stirrup members, each with a planar face overlies the planar faces of the carriers. Each of the carriers is also provided in the planar faces thereof with two larger longitudinal grooves to receive two cylindrical alignment members. However, each stirrup member is provided with only a single longitudinal groove in the planar face thereof. One of the cylindrical alignment members is received within the single longitudinal groove in the stirrup member, and the other of the cylindrical alignment members abuts a planar facing surface of the stirrup member. When more than one stirrup member is used, each stirrup member includes one longitudinal groove in the planar face thereof to receive one of the alignment members, and the other alignment member abuts the planar face surface of each of the stirrup members. Elastic means is also provided to bias the carrier and stirrup member towards each other. Where a plurality of carriers and stirrups are used the elastic means biases the carriers against the stirrups.

While it is possible to use an arrangement to hold a single carrier and a single stirrup member biased towards each other in a casing for cooperation with another single carrier and single stirrup member, it is also possible to have a plurality of tiers or rows of carriers with a single stirrup member. When a plurality of rows are used the base of the carriers in the second and subsequent rows, perform the function of the stirrup members. Accordingly, the top surfaces of all the carriers are provided with the alignment grooves and the base surfaces of the second and subsequent carriers are provided with the single alignment groove in the same manner as the stirrup member.

In this way, the base and sides of the carriers do not have to be machined with a high degree of precision. Suitable alignment of the optical conductors is obtained because of the cooperation between the two alignment conductors and the carriers and stirrups. Each of the carriers has a top planar face in which at least one and preferable a plurality of small V-shaped grooves and two large V-shaped grooves have been provided in an identical fashion. The carriers may be fitted to each other to provide for good alignment in respect of the optical conductors by virtue of the two cylindrical alignment members or rods. One of the alignment members will moreover be received in a groove in the stirrup member or members, or in a plurality of the identically grooved bases of the carriers, and alignment of the optical conductors is further assured under the effect of the elastic means which bias the carriers and stirrup member or members together.

For ease of interchangeably, the large grooves in the carriers may be identical and preferably of a V-shaped cross-section, and the cylindrical alignment members may also be of different or of the same diameter, although this requirement is not essential. What is important is that the alignment members make firm and positive contact with the sides of the V-shaped grooves.

Advantageously, the single groove in the stirrup member or members is of a V-shaped cross-section, in the same way as the cross-section of the large grooves in the carriers which may be identical. While, as indicated, the cylindrical alignment members may be of the same diameter, this is not necessarily so, so long as the large grooves and cylindrical alignment members are properly coordinated.

The small V-shaped groove or grooves are advantageously disposed between the large grooves.

An optical fibre connector can comprise at least one connecting module according to the invention. The connector may be provided with a single module if two single-strand connectors are to be connected together. The connector may also comprise a plurality of modules if it is to be used for connecting either a plurality of pairs of single-strand connectors or two multi-strand conductors, after the strands or fibres of a bundle forming the respective conductors have been separated.

The objects advantages and nature of the invention together with the best mode presently contemplated is described in connection with the accompanying drawings.

DETAILED DESCRIPTION OF THE PREFERRED EMBODIMENTS

Figure 1:
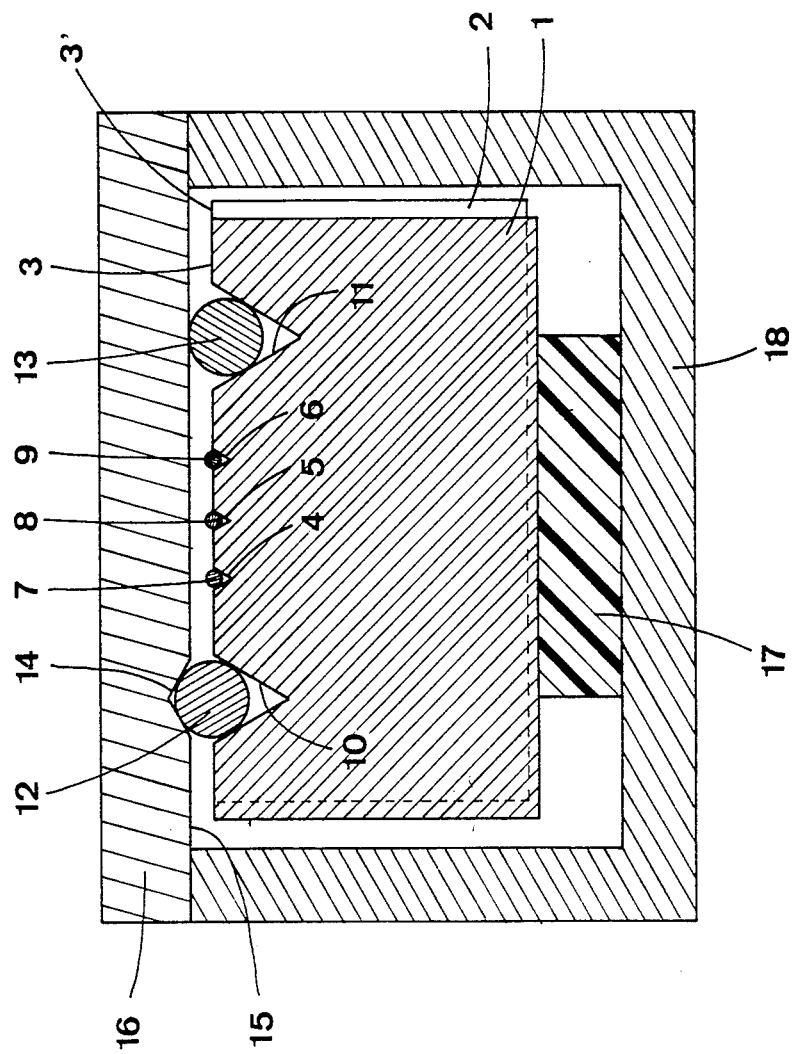
FIG. 1 is a view in transverse section of a first embodiment of a connector including a connecting module according to the invention. The connecting module forms part of the connector for use with three single-strand optical conductors.

In both Figures of the drawing, like components are designated with the same reference numerals.

Referring to FIG. 1, a connecting module comprises two carriers 1 and 2. Provided on the upper planar faces 3 and 3' of carriers 1 and 2, respectively, are three identical small V-shaped grooves 4, 5, and 6 positioned between two large V-shaped grooves 10 and 11. Carrier 2 is positioned behind carrier 1 as viewed in FIG. 1, but the small V-shaped grooves are aligned with each other and the large V-shaped grooves are aligned with each other.

Single-strand optical conductors 7, 8 and 9 are disposed in small V-shaped grooves 4, 5 and 6 of carrier 1, and two cylindrical alignment members or rods 12 and 13 are received in the large V-shaped grooves 10 and 11. The alignment members 12 and 13 may be perfectly cylindrical and identical.

The carriers 1 and 2 are contained within a connector casing 18 and positioned on a spacer in the form of an elastic means 17. Casing 18 has an open top which is closed by means of a stirrup member 16. Carriers 1 and 2 are aligned with and held to the stirrup member 16 by means of the alignment rods 12 and 13 and the elastic means. For this purpose, stirrup member 16 is provided with a planar undersurface having a single V-shaped groove 14 which is aligned with one of the V-shaped grooves 10 and 11. As shown, alignment member 12 is also received in a V-shaped groove 14 provided in the planar underface 15 of stirrup member 16. Carriers 1 and 2 are urged under the bias of elastic means 17 which is disposed between the bottom of connector casing 18 and each of the carriers 1 and 2.

As shown in FIG. 1, elastic means 17 comprise blocks of elastomeric material, but the elastic means could equally well be formed by resilient metal blades or even small coil springs.

In contrast, as there is only one V-shaped groove in stirrup member 16, alignment member 13 is simply applied against planar underface 15 of stirrup member 16. By virtue of the alignment of carriers 1 and 2 and stirrup member 16 along four lines of contact with the cylindrical alignment member 12 and three lines of contact with the cylindrical alignment member 13, an excellent degree of precision with regard to positioning single-strand conductors 7, 8 and 9 in carrier 1 into alignment with the corresponding conductors (not shown, but behind conductors 7, 8 and 9) received in carrier 2 can be obtained.

Conductors 7, 8 and 9 are aligned in such a manner that face to face contact is made with complete contact achieved as a result of the alignment.

Figure 2:
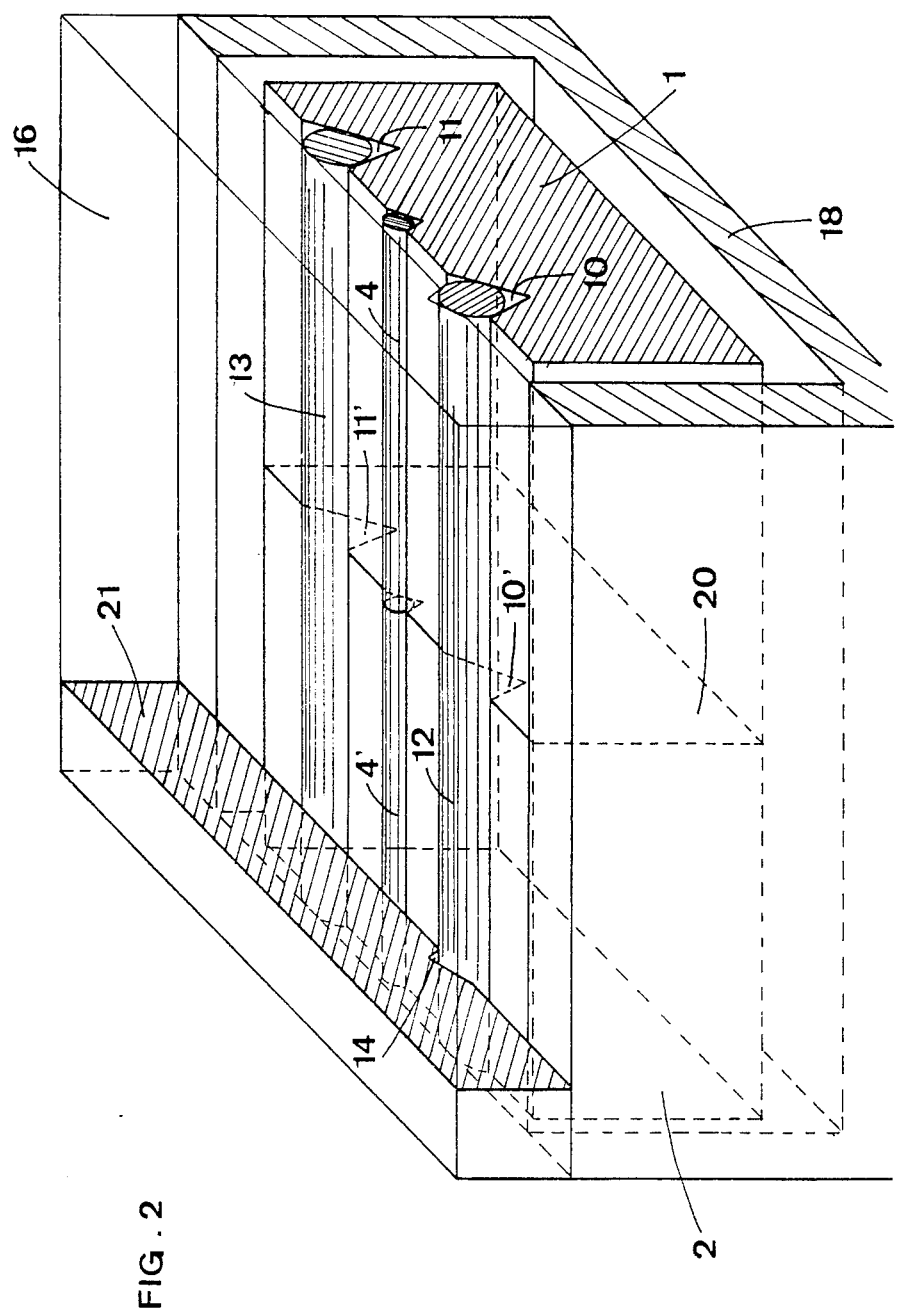
FIG. 2 is a perspective view with a partial section of a second embodiment of a connector provided with a connecting module according to the invention. This module is used for a single-strand optical conductor.

Referring to FIG. 2, carriers 1 and 2 are again shown in contact with each other at a plane 20 and aligned with each other and stirrup member 16. Cross-sectional plane 21 of stirrup member 16 has been voluntarily shifted towards the left in FIG. 2, in order to enhance the clarity and showing of the drawing. Alignment rod 12 makes four lines of contact with grooves 10 and 10' as it is received in the large V-shaped identical grooves 10 and 10' in the carriers 1 and 2, and in the V-shaped groove 14 in stirrup member 16. On the other hand, alignment rod 13 makes only three lines of contact with carriers 1, 2 and stirrup member 16 as the cylindrical alignment member or rod 13 which is only applied against the face or planar surface of stirrup member 16 and received in the large V-shaped identical grooves 11 and 11' of the carriers 1 and 2.

One line of contact is provided between the planar surface of stirrup member 16 and rod 13 and two lines of contact are provided between the facing surfaces of the sides of V-shaped groove 11 and the cylindrical surface of rod 13. As a result of the four point contact provided by alignment rod 12 and the three point contact provided by alignment rod 13, optical conductors 4 and 4' which are to be connected and which are respectively carried by the carriers 1 and 2, are disposed in alignment with each other. Again in order to clarify the drawing, FIG. 2 does not show the elastic means which is disposed on the bottom of the casing 18 of the connector and which biases each of the carriers 1 and 2 towards stirrup member 16.

It should be noted that for the same module, one or more stirrup members may be associated with the two carriers and with the two alignment members, provided that groove 14 is provided in an identical manner in the planar faces 15 of all the stirrup members 16 used.

In a similar manner, it is possible for any number of such modules to be associated within a single connector without thereby departing from the scope of the invention under the same conditions. It should be noted that the various carriers are identical and interchangeable from the point of view of the grooves which receive the alignment members and those grooves for receiving the conductors, and the stirrup members are identical from the point of view of the grooves for receiving one of the alignment members only.

The stirrup member can be made in the form of the carriers 1 and 2 or in the form of stirrup member 16. What is of prime importance is that the alignment members 12 and 13 cooperate with the oppositely facing stirrup member 16 and carriers 1 and 2 for the three lines and four lines of contact.

With regard to the particular type of modules, each can comprise two carriers 1 and 2 and several stirrup-members 16. It is also possible to associate the carriers, within a single connector, so that the carriers are stacked in a single casing 18, in such a way that each carrier like 1 or 2 has its base on top of the elastic means 17 so that each carrier can be applied against the elastic means 17. This enables the carriers to have a V-shaped groove identical to the groove 14 of the stirrup-member 16 for the carrier like 1 or 2 on which it is placed.

Accordingly, while it has not been shown, it is within the scope of the invention to provide a number of carrier-type elements one above the other with two or more tiers of carriers. For a two-tiered unit the lower carrier rests on the elastic means 17 and is provided with the grooves on its upper face as indicated in FIGS. 1 and 2. The carrier in the second tier has a top surface with grooves in a manner similar to carriers 1 and 2. However, the base of carriers 1 and 2 in the second tier is not flat, but it is provided with a single alignment groove, such as groove 14, in the flat plane surface of carrier 1 and 2 which is normally in contact with elastic means 17. This single groove performs the same function as the groove in stirrup member 16, and acts as an alignment groove to assure alignment between the carriers in the first and second tiers with similar carriers in the first and second tiers. One alignment rod is held in two grooves, and the other alignment rod abuts the flat plane surface to make a single line of contact therewith and is carried in another V-shaped groove for two lines of contact to make a total of three lines of contact.

The elastic means 17 which is situated under the carrier like 1 or 2 at the bottom of the pile provides the contact to assure that the conductors carried by the various carriers are properly aligned. The carrier in the first tier cooperates with the carrier in the second tier in the same manner as the carrier of FIG. 1 cooperates with stirrup member 16, and the carrier in the second tier cooperates with the stirrup member 16.

In short, a stirrup member 16 can be constituted by a simple back-plate having a groove 14, as represented on FIGS. 1 and 2, or by another carrier like 1 or 2, whose base is provided with a groove like groove 14. Of course, three tiers of carriers can also be provided, and when three tiers are used, the third tier cooperates with the stirrup member, and the first and second tiers of carriers cooperate with the bases of the carriers in the second and third tiers.

The retention of fibers 7, 8 and 9 in the small V-shaped grooves 4, 5 and 6 of each of the carriers 1 and 2 is achieved by any well known convenient means. For example, fibers 7, 8 and 9 are retained in the grooves 4, 5 and 6, by sticking fibers in the grooves, or by using a resilient member to press the fibers into the grooves, or by using a small bridge molded above each fiber so retained in its groove.

By means of modules and connectors according to the invention, it is possible to connect and disconnect optical fibers by associating, or by separating two carriers like 1 and 2 that are parts of each module. Each of these carriers can equally be associated with any number of a plurality of such carriers in a casing such as casing 18.

While there has been shown and described what is considered to be the preferred embodiments of the invention, it will be obvious to those skilled in the art that various changes and modifications may be made therein without departing from the scope of the invention.

I claim:

1. A connecting module for a single-strand optical conductor, comprising
    two carriers adapted for placement into end-to-end abutment, each said carrier including in an identical manner a planar face having an optical conductor carrying longitudinal groove of small V-shaped cross-section therein, each of said carriers being adapted for receiving a respective one of the single-strand optical conductors to be connected in said small groove therein with one end of the conductor disposed in the plane of the facing end of the respective one of the two said carriers, and each of said carriers having in the planar faces thereof a pair of alignment grooves;
    a stirrup member for each said carriers, each said stirrup member including a planar face overlying the planar face of said carrier and having an alignment groove therein;
    two cylindrical alignment members, each of which is received in said alignment grooves of said carriers, only one of said cylindrical alignment members being received in said alignment groove of said stirrup and the other of said alignment members being applied against said planar face of said stirrup member; and,
    elastic means associated with said stirrup member and said carrier for biasing thereof towards each other.

2. A connecting module according to claim 1, in which said alignment grooves are of a V-shaped section.

3. A connecting module according to claim 1, in which said alignment members are of different diameters.

4. A connecting module according to claim 1, in which said alignment members are of the same diameter.

5. A connecting module according to claim 1, including
    at least two tiers of said carriers, one of said tiers being in contact with said elastic means, the carriers in said other tier being positioned above said one tier and including a planar base surface having a single additional alignment groove, and
    two additional alignment members, one of said additional alignment members being received in said additional alignment groove and one of said alignment grooves, and the other of said additional alignment members being received in the other of said alignment grooves and being applied against said planar base surface of the carrier in said second tier.

6. A connecting module according to claim 1, in which said alignment members are perfectly cylindrical.

7. A connecting module according to claim 1, in which said alignment members are received on the carriers in identical alignment grooves.

8. A connecting module according to claim 1, in which said small V-shaped groove is disposed between said two alignment grooves.

9. A connecting module according to claim 1, 2, 3, 4, 5, 6, 7 or 8, in which said groove in said stirrup member is of a V-shaped section.

10. A connector for optical conductors comprising at least one connecting module as claimed in claim 1.

* * * * *